United States Patent
Bai et al.

(10) Patent No.: US 12,500,316 B2
(45) Date of Patent: Dec. 16, 2025

(54) BATTERY CELL, BATTERY, AND POWER CONSUMING APPARATUS

(71) Applicant: CONTEMPORARY AMPEREX TECHNOLOGY CO., LIMITED, Ningde (CN)

(72) Inventors: Xiangyun Bai, Ningde (CN); Zhen Li, Ningde (CN); Yuqian Wen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/295,713

(22) Filed: Aug. 11, 2025

(65) Prior Publication Data

US 2025/0364706 A1    Nov. 27, 2025

Related U.S. Application Data

(63) Continuation of application No. PCT/CN2023/119985, filed on Sep. 20, 2023.

(30) Foreign Application Priority Data

May 4, 2023 (CN) .......................... 202321038700.0

(51) Int. Cl.
*H01M 50/559* (2021.01)
*H01M 50/107* (2021.01)
(Continued)

(52) U.S. Cl.
CPC ....... *H01M 50/559* (2021.01); *H01M 50/107* (2021.01); *H01M 50/503* (2021.01);
(Continued)

(58) Field of Classification Search
CPC ............. H01M 50/559; H01M 50/503; H01M 50/107; H01M 50/552; H01M 50/55
See application file for complete search history.

(56) References Cited

U.S. PATENT DOCUMENTS

2013/0265001 A1*  10/2013  Popper .................. H01M 50/55
                                                          362/183

FOREIGN PATENT DOCUMENTS

| CN | 207183325   | 4/2018 |
| CN | 215869580 U | 2/2022 |

(Continued)

OTHER PUBLICATIONS

CN 215869580 English translation. Yan et al. China. Feb. 18, 2022. (Year: 2022).*

(Continued)

*Primary Examiner* — Christopher P Domone
(74) *Attorney, Agent, or Firm* — K&L Gates LLP

(57) ABSTRACT

The present application provides a battery cell, a battery, and a power consuming apparatus, and belongs to the field of battery technologies. The battery cell includes a shell, an electrode assembly, a first terminal post, and a second terminal post. The shell has a circular wall portion. The electrode assembly is accommodated in the shell. The first terminal post and the second terminal post have opposite polarities. The first terminal post and the second terminal post are spaced apart on the wall portion and are both electrically connected to the electrode assembly. A minimum distance between the first terminal post and a central axis of the wall portion is greater than a minimum distance between the second terminal post and the central axis of the wall portion in a radial direction of the wall portion.

16 Claims, 5 Drawing Sheets

(51) Int. Cl.
*H01M 50/503* (2021.01)
*H01M 50/55* (2021.01)
*H01M 50/552* (2021.01)
*H01M 50/593* (2021.01)

(52) U.S. Cl.
CPC ......... *H01M 50/55* (2021.01); *H01M 50/593* (2021.01); *H01M 2220/20* (2013.01)

(56) References Cited

FOREIGN PATENT DOCUMENTS

| | | |
|---|---|---|
| CN | 114628863 A | 6/2022 |
| CN | 217485562 | 9/2022 |
| CN | 21769156 | 10/2022 |
| CN | 218039722 U | 12/2022 |
| CN | 218602574 | 3/2023 |
| JP | 2020202071 | 12/2020 |

OTHER PUBLICATIONS

The International Search Report received in the counterpart International Application No. PCT/CN2023/119985, dated Nov. 24, 2023, 5 pages with English translation.
The ISA Written Opinion received in the counterpart International Application No. PCT/CN2023/119985, dated Nov. 24, 2023, 6 pages with English translation.
The Grant Notice received in the counterpart CN Application No. 202321038700.0, dated Aug. 16, 2023, 3 pages with English translation.

\* cited by examiner

BATTERY CELL, BATTERY, AND POWER CONSUMING APPARATUS

CROSS-REFERENCE TO RELATED APPLICATIONS

The present application is a continuation of International Application No. PCT/CN2023/119985, filed on Sep. 20, 2023, which claims priority to Chinese Patent Application No. 2023210387000, entitled "BATTERY CELL, BATTERY, AND POWER CONSUMING APPARATUS" and filed on May 4, 2023, which is incorporated herein by reference in its entirety.

TECHNICAL FIELD

The present application relates to the field of battery technologies, and in particular, to a battery cell, a battery, and a power consuming apparatus.

BACKGROUND

In recent years, new energy automobiles have been rapidly developed. In the field of electric automobiles, a power battery, as a power source of an electric automobile, plays an important role that is irreplaceable. With the vigorous promotion of new energy automobiles, demands for power battery products also increase. As a core component of a new energy automobile, a battery has relatively high requirements in terms of production efficiency and manufacturing costs. The battery generally includes a battery cell. However, a cycle time of an existing battery cell in a production process is improper, resulting in low production efficiency of the battery. This is disadvantageous to reduce manufacturing costs of the battery.

SUMMARY

Examples of the present application provide a battery cell, a battery, and a power consuming apparatus, to effectively improve production efficiency of the battery cell.

According to a first aspect, an example of the present application provides a battery cell, including a shell, an electrode assembly, a first terminal post, and a second terminal post. The shell has a circular wall portion. The electrode assembly is accommodated in the shell. The first terminal post and the second terminal post have opposite polarities. The first terminal post and the second terminal post are spaced apart on the wall portion and are both electrically connected to the electrode assembly. A minimum distance between the first terminal post and a central axis of the wall portion is greater than a minimum distance between the second terminal post and the central axis of the wall portion in a radial direction of the wall portion.

In the foregoing technical solution, the first terminal post and the second terminal post are both disposed on the wall portion of the shell, so that the battery cell has a structure in which terminal posts are drawn out on a same side. The wall portion has a circular structure, and the minimum distance between the first terminal post and the central axis of the wall portion is greater than the minimum distance between the second terminal post and the central axis of the wall portion in the radial direction of the wall portion, so that at least a portion of the first terminal post and at least a portion of the second terminal post center on the central axis of the wall portion and are located on circumferences of different radii in structure, thereby facilitating distinguishing and avoiding errors in a formation process of the battery cell. The battery cell does not need to be secondarily positioned to adjust positions corresponding to the first terminal post and the second terminal post but a positive probe and a negative probe of a formation device are configured into an annular structure in which an outer ring surrounds an inner ring and can be in separate contact with the first terminal post and the second terminal post, thereby facilitating optimization of a cycle time of the battery cell to improve production efficiency of the battery cell and reduce production costs.

In some examples, the first terminal post is arc-shaped and includes an inner arc surface. A projection of the inner arc surface in a thickness direction of the wall portion is located on a circumference of a first circle. A center of the first circle is located on the central axis of the wall portion. The second terminal post is located within the first circle in the radial direction of the wall portion.

In the foregoing technical solution, the first terminal post is arc-shaped and has the inner arc surface, and the second terminal post is located within the first circle in which the inner arc surface of the first terminal post is located, so as to implement a structure in which the first terminal post surrounds the exterior of the second terminal post in an arc extension direction, thereby implementing a structure in which the first terminal post and the second terminal post are located on different circumferences by centering on the central axis of the wall portion, so as to facilitate distinguishing and avoid errors for the first terminal post and the second terminal post in the formation process of the battery cell, and avoid secondary positioning of the first terminal post and the second terminal post.

In some examples, two ends of the first terminal post separately form two first end faces in an arc extension direction of the first terminal post. The two first end faces are coplanar.

In the foregoing technical solution, the two first end faces of the first terminal post having the arc-shaped structure in the arc extension direction are coplanar, so as to facilitate processing and forming of the first terminal post. The first terminal post may be formed by cutting or stamping only once, so as to be beneficial to improving the production efficiency of the first terminal post.

In some examples, the second terminal post includes an outer arc surface. A projection of the outer arc surface in the thickness direction of the wall portion is located on a circumference of a second circle. The second circle and the first circle are concentric, and a radius of the second circle is less than a radius of the first circle.

In the foregoing technical solution, the second terminal post has the outer arc surface, and the radius of the second circle in which the outer arc surface of the second terminal post is located is less than the radius of the first circle in which the inner arc surface of the first terminal post is located, so that the radius of the inner arc surface of the first terminal post is greater than the radius of the outer arc surface of the second terminal post, thereby facilitating implementation of a structure in which the first terminal post and the second terminal post are located on different circumferences by centering on the central axis of the wall portion.

In some examples, the second terminal post is arc-shaped.

In the foregoing technical solution, the second terminal post has an arc-shaped structure, so as to facilitate assembly of the first terminal post and the second terminal post, and reduce material waste of the second terminal post, thereby improving the production efficiency of the battery cell and reducing manufacturing costs.

In some examples, two ends of the second terminal post separately form two second end faces in the arc extension direction of the second terminal post. The two second end faces are coplanar.

In the foregoing technical solution, the two second end faces of the second terminal post having the arc-shaped structure in the arc extension direction are coplanar, so as to facilitate processing and forming of the second terminal post. The second terminal post may be formed by cutting or stamping only once, so as to be beneficial to improving the production efficiency of the second terminal post.

In some examples, an orthographic projection of the first terminal post is located in a first semicircular region and an orthographic projection of the second terminal post is located in a second semicircular region in the thickness direction of the wall portion. The first semicircular region and the second semicircular region jointly form a circular region of which a center is located on the central axis of the wall portion.

In the foregoing technical solution, the projections of the first terminal post and the second terminal post in the thickness direction of the wall portion are respectively located in the first semicircular region and the second semicircular region, and the first semicircular region and the second semicircular region jointly form the circular region of which the center is located on the central axis of the wall portion, so that the first terminal post and the second terminal post are spaced apart on the wall portion. On the one hand, the first terminal post and the second terminal post can be assembled, thereby facilitating assembly difficulty of the battery cell. On the other hand, spacing between the first terminal post and the second terminal post can be further increased, to reduce a risk of short circuit between the first terminal post and the second terminal post.

In some examples, the first terminal post is annular, and the first terminal post and the wall portion are disposed coaxially. Additionally or alternatively, the second terminal post is annular, and the second terminal post and the wall portion are disposed coaxially.

In the foregoing technical solution, the first terminal post has an annular structure, thereby forming an annular structure in which the first terminal post surrounds the exterior of the second terminal post. Therefore, a contact area between the first terminal post and a probe of the formation device can be increased in the formation process of the battery cell. Therefore, the probe can be in contact with the first terminal post without providing an annular probe of the formation device. Similarly, the second terminal post has an annular structure, thereby forming an annular structure in which the second terminal post is located inside the inner arc surface of the first terminal post. Therefore, a contact area between the second terminal post and a probe of the formation device can be increased in the formation process of the battery cell. Therefore, the probe can be in contact with the second terminal post without providing an annular probe of the formation device.

In some examples, the electrode assembly has a first tab and a second tab having opposite polarities. The first tab and the second tab are both located at an end, facing the wall portion, of the electrode assembly in the thickness direction of the wall portion. The first tab and the second tab are respectively electrically connected to the first terminal post and the second terminal post.

In the foregoing technical solution, the electrode assembly has the first tab and the second tab having opposite polarities, and the first tab and the second tab are respectively electrically connected to the first terminal post and the second terminal post, to implement input or output of electric energy of the electrode assembly. The first tab and the second tab are both disposed at the end, facing the wall portion, of the electrode assembly, so that the first tab and the second tab are respectively connected to the first terminal post and the second terminal post, thereby being beneficial to reducing assembly difficulty of the electrode assembly with the first terminal post and the second terminal post, to improve the production efficiency of the battery cell.

In some examples, the battery cell further includes a first insulating element, and the first insulating element is disposed between the first terminal post and the wall portion, to insulate the first terminal post from the wall portion. Additionally or alternatively, the battery cell further includes a second insulating element, and the second insulating element is disposed between the second terminal post and the wall portion, to insulate the second terminal post from the wall portion.

In the foregoing technical solution, the battery cell is further provided with the first insulating element. The first insulating element is disposed between the first terminal post and the wall portion, to insulate the first terminal post from the wall portion, so that a risk of short circuit between the first terminal post and the wall portion can be reduced, to relieve a phenomenon of short circuit between the first terminal post and the second terminal post. Similarly, the battery cell is further provided with the second insulating element. The second insulating element is disposed between the second terminal post and the wall portion, to insulate the second terminal post from the wall portion, so that a risk of short circuit between the second terminal post and the wall portion can be reduced, to relieve a phenomenon of short circuit between the second terminal post and the first terminal post.

In some examples, the battery cell further includes a first connecting element. The first connecting element is penetrated in the wall portion in the thickness direction of the wall portion, the first connecting element is connected to the first terminal post, and the first connecting element is electrically connected to the electrode assembly. Additionally or alternatively, the battery cell further includes a second connecting element. The second connecting element is penetrated in the wall portion in the thickness direction of the wall portion, the second connecting element is connected to the second terminal post, and the second connecting element is electrically connected to the electrode assembly.

In the foregoing technical solution, the battery cell is further provided with the first connecting element. The first connecting element is penetrated in the wall portion in the thickness direction of the wall portion, so that the first connecting element can connect the first terminal post and the electrode assembly, thereby being beneficial to reducing assembly difficulty of electrical connection between the first terminal post and the electrode assembly, and reducing assembly difficulty of the first terminal post on the wall portion. Similarly, the battery cell is further provided with the second connecting element. The second connecting element is penetrated in the wall portion in the thickness direction of the wall portion, so that the second connecting element can connect the second terminal post and the electrode assembly, thereby being beneficial to reducing assembly difficulty of electrical connection between the second terminal post and the electrode assembly, and reducing assembly difficulty of the second terminal post on the wall portion.

In some examples, the shell is cylindrical, and an axis direction of the shell is the thickness direction of the wall portion.

In the foregoing technical solution, the shell of the battery cell is cylindrical, so that the battery cell has a cylindrical structure, and the axis direction of the shell is the thickness direction of the wall portion. To be specific, the wall portion is an end wall of the shell in the axis direction, so that the wall portion is circular. The battery cell using this structure facilitates assembly of the first terminal post and the second terminal post on the shell, so as to be beneficial to reducing assembly difficulty of the battery cell. In addition, secondary positioning is not required to adjust the corresponding positions of the first terminal post and the second terminal post in the formation process of the battery cell having the cylindrical structure, so as to be beneficial to optimizing the cycle time of the battery cell, to improve the production efficiency of the battery cell.

In some examples, the shell includes a case and an end cover. An accommodating cavity having an opening is formed inside the case. The accommodating cavity is configured to accommodate the electrode assembly. The end cover closes the opening. The end cover is the wall portion.

In the foregoing technical solution, the wall portion of the shell is configured into the end cover of the shell for closing the opening of the case. The battery cell using this structure facilitates assembly of the first terminal post and the second terminal post, and connection difficulty of the first terminal post and the second terminal post to the electrode assembly can be reduced, thereby improving the production efficiency of the battery cell.

In some examples, the shell includes a case and an end cover. The case includes a side wall and the wall portion that are integrally formed. The side wall is disposed around the wall portion. One end of the side wall is connected to the wall portion and the other end of the side wall is closed to form an opening in the thickness direction of the wall portion. The side wall and the wall portion jointly define an accommodating cavity for accommodating the electrode assembly. The end cover closes the opening.

In the foregoing technical solution, the wall portion is configured into a wall, opposite to the end cover, of the case. In the battery cell having this structure, the wall portion on which the first terminal post and the second terminal post are disposed can be far away from the end cover, and there is no direct connection relationship between the wall portion and the end cover. Therefore, in a use process of the battery cell, a phenomenon that a force generated when the first terminal post and the second terminal post pull or twist the end cover acts on a connection position of the end cover and the case can be relieved, to reduce a risk of connection failure between the end cover and the case, thereby further reducing a risk of liquid leakage in the use process of the battery cell.

According to a second aspect, an example of the present application further provides a battery, including the foregoing battery cell.

According to a third aspect, an example of the present application further provides a power consuming apparatus, including the foregoing battery cell. The battery cell is configured to supply electric energy.

BRIEF DESCRIPTION OF THE DRAWINGS

To more clearly illustrate the technical solution in the examples of the present application, a brief description will be given below of the accompanying drawings which are required to be used in the examples. It will be understood that the following drawings illustrate only some examples of the present application and are therefore not to be considered as limiting the scope. Other related drawings may be obtained by a person of ordinary skill in the art according to these drawings without inventive effort.

Figure 1:
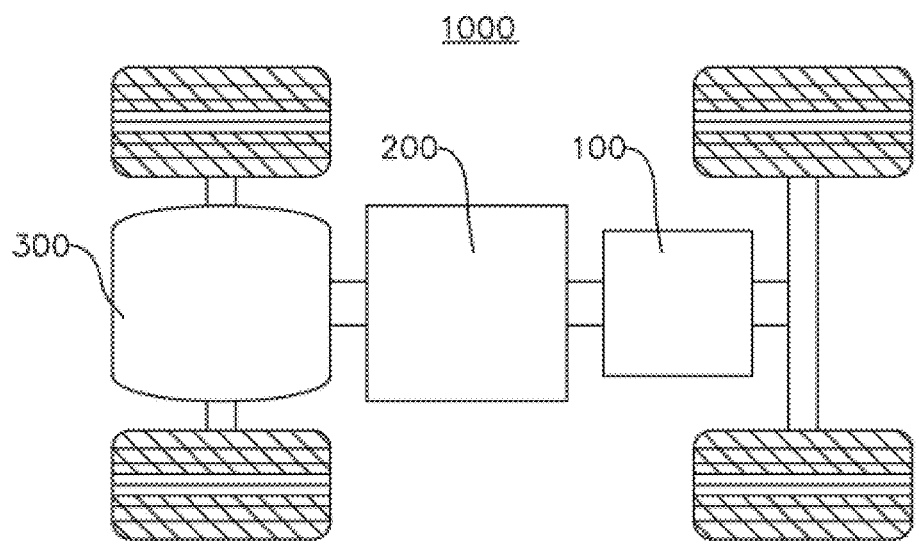
FIG. 1 is a schematic diagram of a structure of a vehicle according to some examples of the present application.

Reference numerals: 1000—vehicle; 100—battery; 10—box; 11—first box body; 12—second box body; 20—battery cell; 21—shell; 211—wall portion; 2111—liquid injection hole; 2112—first through hole; 2113—second through hole; 212—case; 2121—opening; 213—end cover; 22—electrode assembly; 221—first tab; 222—second tab; 23—first terminal post; 231—inner arc surface; 232—first end face; 24—second terminal post; 241—outer arc surface; 242—second end face; 25—first connecting element; 26—second connecting element; 27—liquid injection plug; 28—first insulating element; 29—second insulating element; 30—first current collecting member; 31—second current collecting member; 32—third insulating element; 200—controller; 300—motor; X—thickness direction of wall portion.

DETAILED DESCRIPTION

To make the objectives, technical solutions, and advantages of the examples of the present application clearer, the following clearly describes the technical solutions in the examples of the present application with reference to the accompanying drawings in the examples of the present application. Apparently, the described examples are some examples of the present application rather than all of the examples. All other examples obtained by a person of ordinary skill in the art based on the examples of the present application without making creative efforts shall fall within the protection scope of the present application.

Unless otherwise defined, all technical and scientific terms used in the present application have same meanings as commonly understood by a person skilled in the technical field of the present application. The terms used in the specification of the present application are merely for an objective of describing specific examples, and are not intended to limit the present application. The terms "include", "have" and any variations thereof in the specification and claims of the present application and in the foregoing descriptions of the accompanying drawings are intended to cover non-exclusive inclusion. In the specification, claims, or accompanying drawings of the present application, the terms "first", "second", and so on are intended to distinguish different objects but do not describe a specific order or primary and secondary relation.

Reference to "an example" in the present application means that a particular feature, structure or characteristic described in combination with the example may be included in at least one example of the present application. The appearances of the phrase in various places in the specification are not necessarily all referring to the same example, nor a separate or alternative example that is mutually exclusive of other examples.

In the descriptions of the present application, it should be noted that unless otherwise explicitly specified or defined, the terms such as "mount", "connect", "connection", and "attach" should be understood in a broad sense. For example, the connection may be a fixed connection, a detachable connection, or an integral connection. Alternatively, the connection may be a direct connection, an indirect connection through an intermediary, or internal communication between two components. A person of ordinary skill in the art may understand specific meanings of the terms in the present application according to specific situations.

In the present application, the term "and/or" is merely an association to describe associated objects. It may mean that there are three relationships, such as A and/or B, indicating that A exists alone, A and B exist at the same time, and B exists alone. In addition, in the present application, the character "/" usually indicates an "or" relationship between the associated objects.

In the examples of the present application, same reference numerals represent same components, and for brevity, detailed descriptions of the same components are omitted in different examples. It will be understood that dimensions, such as the thickness, the length, and the width of various components in the examples of the present application and the entire thickness, length, and the width of an integrated apparatus shown in the accompanying drawings are merely exemplary descriptions, and should not be construed as any limitation to the present application.

In the present application, the term "a plurality of" means two or more (including two).

In the examples of the present application, a battery cell may be a secondary battery. The secondary battery is referred to as a battery cell that may be continuously used by activating an active material in a charging manner after the battery cell is discharged.

The battery cell may be a lithium-ion battery, a sodium-ion battery, a sodium-lithium-ion battery, a lithium metal battery, a sodium metal battery, a lithium-sulfur battery, a magnesium-ion battery, a nickel-metal hydride battery, a nickel-cadmium battery, a lead-acid battery, or the like. This is not limited in the examples of the present application.

The battery cell generally includes an electrode assembly. The electrode assembly includes a positive electrode, a negative electrode, and a spacer. During charging and discharging of the battery cell, active ions (for example, lithium ions) are intercalated and deintercalated back and forth between the positive electrode and the negative electrode. The spacer is disposed between the positive electrode and the negative electrode, may prevent a short circuit between the positive and negative electrodes, and may allow the active ions to pass through.

In some examples, the positive electrode may be a positive electrode plate. The positive electrode plate may include a positive electrode current collector and a positive electrode active material disposed on at least one surface of the positive electrode current collector.

As an example, the positive electrode current collector has two surfaces opposite to each other in a thickness direction of the positive electrode current collector. The positive electrode active material is disposed on either or both of the two opposite surfaces of the positive electrode current collector.

As an example, the positive electrode current collector may be a metal foil or a composite current collector. For example, silver surface-treated aluminum or stainless steel, stainless steel, copper, aluminum, nickel, a carbon electrode, carbon, nickel, titanium, or the like may be used as the metal foil. The composite current collector may include a polymer material substrate and a metal layer. The composite current collector may be formed by forming a metal material (aluminum, an aluminum alloy, nickel, a nickel alloy, titanium, a titanium alloy, silver, a silver alloy, or the like) on a polymer material substrate (for example, a substrate of polypropylene, polyethylene terephthalate, polybutylene terephthalate, polystyrene, or polyethylene).

As an example, the positive electrode active material may include at least one of the following materials: lithium-containing phosphates, lithium transition metal oxides, and their respective modified compounds. However, the present application is not limited to such materials, and may alternatively use another conventional material that may be used as a positive electrode active material for batteries. Only one or a combination of two or more of these positive electrode active materials may be used. An example of the lithium-containing phosphates may include, but is not limited to, at least one of lithium iron phosphate (for example, $LiFePO_4$ (also referred to as LFP for short)), a composite material of lithium iron phosphate and carbon, lithium manganese phosphate (for example, $LiMnPO_4$), a composite material of lithium manganese phosphate and carbon, lithium iron manganese phosphate, and a composite material of lithium manganese iron phosphate and carbon.

In some examples, the negative electrode may be a negative electrode plate. The negative electrode plate may include a negative electrode current collector.

As an example, the negative electrode current collector may be a metal foil, metal foam, or a composite current collector. For example, silver surface-treated aluminum or stainless steel, stainless steel, copper, aluminum, nickel, a carbon electrode, carbon, nickel, titanium, or the like may be used as the metal foil. The metal foam may be nickel foam, copper foam, aluminum foam, alloy foam, carbon foam, or the like. The composite current collector may include a polymer material substrate and a metal layer. The composite current collector may be formed by forming a metal material (copper, a copper alloy, nickel, a nickel alloy, titanium, a titanium alloy, silver, a silver alloy, or the like) on a polymer material substrate (for example, a substrate of polypropylene, polyethylene terephthalate, polybutylene terephthalate, polystyrene, or polyethylene).

As an example, the negative electrode plate may include a negative electrode current collector and a negative electrode active material disposed on at least one surface of the negative electrode current collector.

As an example, the negative electrode current collector has two surfaces opposite to each other in a thickness direction of the negative electrode current collector. The negative electrode active material is disposed on either or both of the two opposite surfaces of the negative electrode current collector.

As an example, the negative electrode active material may be a negative electrode active material used for a battery cell and well known in the art. As an example, the negative electrode active material may include at least one of the following materials: artificial graphite, natural graphite, soft carbon, hard carbon, a silicon-based material, a tin-based material, lithium titanate, and the like.

In some examples, a material of the positive electrode current collector may be aluminum. A material of the negative electrode current collector may be copper.

In some embodiments, the electrode assembly further includes a spacer. The spacer is disposed between the positive electrode and the negative electrode.

In some embodiments, the spacer is a separator. There may be multiple types of separators, and any well-known separator with a porous structure having good chemical stability and mechanical stability may be selected.

As an example, a main material of the separator may be selected from at least one of glass fiber, non-woven fabric, polyethylene, polypropylene, polyvinylidene fluoride, and ceramic.

In some embodiments, the spacer is a solid electrolyte. The solid electrolyte is disposed between the positive electrode and the negative electrode, and is capable of transmitting ions and isolating the positive and negative electrodes.

In some embodiments, the battery cell further includes an electrolyte. The electrolyte is capable of conducting ions between the positive and negative electrodes. The electrolyte may be liquid, gelled, or solid.

In some embodiments, the electrode assembly has a winding structure. The positive electrode plate and the negative electrode plate are wound into the winding structure.

In some embodiments, the electrode assembly has a stacked structure.

In some embodiments, the shape of the electrode assembly may be a cylindrical shape, a flat shape, a polygonal prism shape, or the like.

In some embodiments, the electrode assembly is provided with a tab. The tab may output a current from the electrode assembly. The tab includes a positive tab and a negative tab.

In some embodiments, the battery cell may include a shell. The shell is configured to encapsulate the electrode assembly, the electrolyte, and other components. The shell may be a steel shell, an aluminum shell, a plastic shell (for example, polypropylene), a composite metal shell (for example, a composite copper-aluminum shell), or the like.

A battery mentioned in examples of the present application is a single physical module including one or more battery cells to provide a higher voltage and a higher capacity.

In some examples, the battery may be a battery module. When there are a plurality of battery cells, the plurality of battery cells are arranged and fixedly formed into a battery module.

In some examples, the battery may be a battery pack. The battery pack includes a box and a battery cell. The battery cell or the battery module is accommodated in the box.

In some examples, the box may be used as a portion of a chassis structure of a vehicle. For example, a portion of the box may become at least a portion of a floor of the vehicle. Alternatively, a portion of the box may become at least a portion of a cross beam and a longitudinal beam of the vehicle.

In some examples, the battery may be an energy storage apparatus. The energy storage apparatus includes an energy storage container, an energy storage electric cabinet, and the like.

The battery has outstanding advantages such as a high energy density, a small environmental pollution, a large power density, a long service life, a wide adaptation range, and a small self-discharging coefficient, and is an important component of the development of new energy sources nowadays.

For a general battery cell, there may be a plurality of structures of the battery cell. A battery cell having a cylindrical structure has become a relatively popular structural form of the battery cell due to advantages such as a simple structure, a high production efficiency, and a high standardization degree. The battery cell usually includes a shell and an electrode assembly. A positive terminal post and a negative terminal post are disposed on the shell. The electrode assembly is accommodated in the shell. The electrode assembly has a positive tab and a negative tab. The positive tab and the negative tab are respectively electrically connected to the positive terminal post and the negative terminal post, to implement output or input of positive and negative electrodes of the battery cell. In a related technology, to optimize utilization of an internal space of the battery cell having the cylindrical structure and improve energy density of the battery cell, the electrode assembly of the battery cell is configured into a structure in which the positive tab and the negative tab are disposed at a same end. Therefore, the battery cell has a structure in which the positive terminal post and the negative terminal post are drawn out at a same end, and the positive terminal post and the negative terminal post are mutually symmetric in structure. However, in a production process of the battery cell, the battery cell needs to be formed. When the battery cell is formed, positive and negative probes of a formation device need to be respectively electrically connected to the positive terminal post and the negative terminal post of the battery cell. However, the battery cell having this structure needs to be secondarily positioned, to ensure that the positive and negative probes are respectively electrically connected to the positive terminal post and the negative terminal post of the battery cell. Consequently, a cycle time of the battery cell is improper, which is not beneficial to improving the production efficiency of the battery cell.

Based on the foregoing consideration, to resolve a problem of low production efficiency of a battery cell, an example of the present application provides a battery cell. The battery cell includes a shell, an electrode assembly, a first terminal post, and a second terminal post. The shell has a circular wall portion. The electrode assembly is accommodated in the shell. The first terminal post and the second terminal post have opposite polarities. The first terminal post and the second terminal post are spaced apart on the wall portion and are both electrically connected to the electrode assembly. A minimum distance between the first terminal post and a central axis of the wall portion is greater than a minimum distance between the second terminal post and the central axis of the wall portion in a radial direction of the wall portion.

In the battery cell having this structure, the first terminal post and the second terminal post are both disposed on the wall portion of the shell, so that the battery cell has a structure in which terminal posts are drawn out on a same side. The wall portion has a circular structure, and the minimum distance between the first terminal post and the central axis of the wall portion is greater than the minimum distance between the second terminal post and the central axis of the wall portion in the radial direction of the wall portion, so that at least a portion of the first terminal post and at least a portion of the second terminal post center on the central axis of the wall portion and are located on circles of different radii in structure, thereby facilitating distinguishing and avoiding errors in a formation process of the battery cell.

The battery cell does not need to be secondarily positioned to adjust positions corresponding to the first terminal post and the second terminal post but a positive probe and a negative probe of a formation device are configured into an annular structure in which an outer ring surrounds an inner ring and can be in separate contact with the first terminal post and the second terminal post, thereby facilitating optimization of a cycle time of the battery cell to improve production efficiency of the battery cell and reduce production costs.

The battery cell disclosed in this example of the present application may be used in but is not limited to a power consuming apparatus such as a vehicle, a ship, or an aircraft. The battery cell and the battery disclosed in the present application may be used for forming a power supply system of the power consuming apparatus. In this way, it is beneficial to optimizing the cycle time of the battery cell in the production process, so as to improve the production efficiency of the battery cell.

An example of the present application provides a power consuming apparatus using a battery as a power supply. The power consuming apparatus may be, but is not limited to, a mobile phone, a tablet, a laptop, an electric toy, an electric tool, a battery car, an electric automobile, a ship, a spacecraft, or the like. The electric toy may include a fixed or mobile electric toy, for example, a game console, an electric automobile toy, an electric ship toy, and an electric airplane toy. The spacecraft may include an airplane, a rocket, a spacecraft, a spaceship, and the like.

For ease of description, the following example is described by using a vehicle 1000 as a power consuming apparatus according to an example of the present application.

Refer to FIG. 1. FIG. 1 is a schematic structural diagram of a vehicle 1000 according to some examples of the present application. The vehicle 1000 may be a fuel powered vehicle, a gas powered vehicle, or a new energy vehicle. The new energy vehicle may be a pure electric vehicle, a hybrid electric vehicle, or an extended range vehicle, or the like. The inner part of the vehicle 1000 is provided with a battery 100. The battery 100 may be arranged at the bottom, head, or tail of the vehicle 1000. The battery 100 may be configured to supply power to the vehicle 1000. For example, the battery 100 may be used as an operating power supply of the vehicle 1000. The vehicle 1000 may further include a controller 200 and a motor 300. The controller 200 is configured to control the battery 100 to supply power to the motor 300, for example, to meet working power requirements during starting, navigation, and traveling of the vehicle 1000.

In some examples of the present application, the battery 100 may serve as a power supply for operating the vehicle 1000, and may alternatively serve as a power supply for driving the vehicle 1000, in place of or partially in place of fuel or natural gas, to provide driving power for the vehicle 1000.

Figure 2:
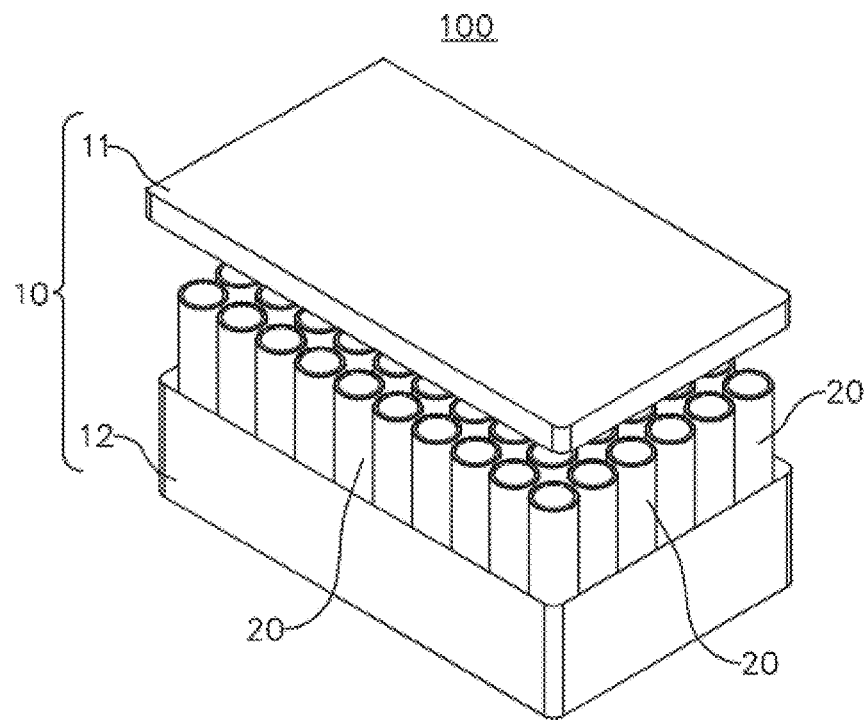
FIG. 2 is an exploded view of a structure of a battery according to some examples of the present application.
Figure 3:
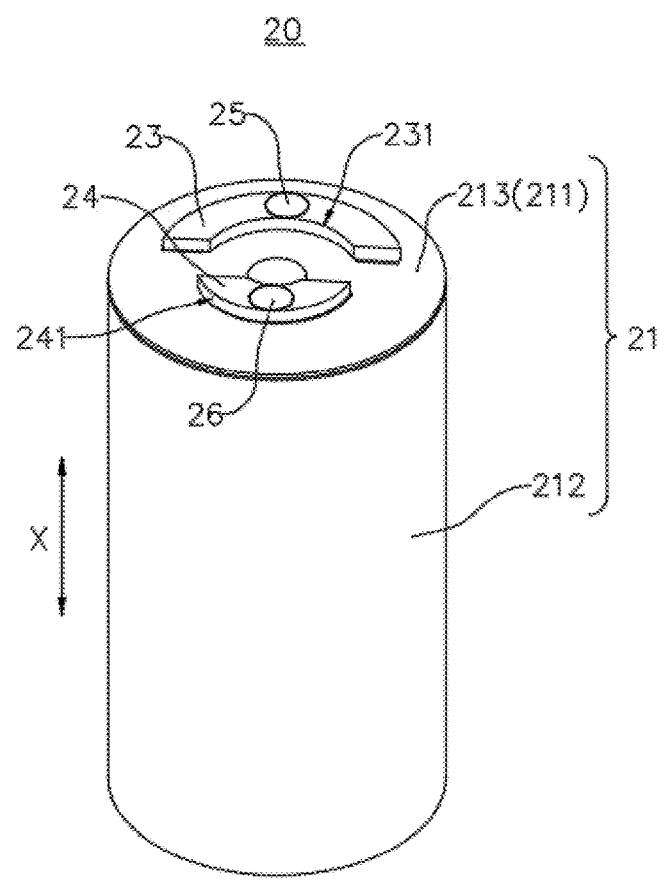
FIG. 3 is a schematic diagram of a structure of a battery cell according to some examples of the present application.

Refer to FIG. 2 and FIG. 3. FIG. 2 is an exploded view of a structure of a battery 100 according to some examples of the present application. FIG. 3 is a schematic diagram of a structure of a battery cell 20 according to some examples of the present application. The battery 100 may include a box 10 and a battery cell 20. The battery cell 20 is accommodated in the box 10.

The box 10 is configured to provide an assembly space for the battery cell 20. The box 10 may use a variety of structures. In some examples, the box 10 may include a first box body 11 and a second box body 12. The first box body 11 and the second box body 12 cover each other. The first box body 11 and the second box body 12 jointly define the assembly space for accommodating the battery cell 20. The second box body 12 may be a hollow structure with an open end. The first box body 11 may be a plate-like structure. The first box body 11 covers an open side of the second box body 12, so that the first box body 11 and the second box body 12 jointly define the assembly space. In another example, the first box body 11 and the second box body 12 may each alternatively be a hollow structure having an open side. The open side of the first box body 11 covers the open side of the second box body 12. Certainly, the box 10 formed by the first box body 11 and the second box body 12 may be in various shapes, such as a cylinder or a cuboid. For example, in FIG. 2, the shape of the box 10 is a cuboid.

Optionally, in the battery 100, there may be one or more battery cells 20 accommodated in the box 10. When there are a plurality of battery cells 20 accommodated in the box 10, the plurality of battery cells 20 may be connected in series, parallel, or series-parallel. The series-parallel connection means that both series connection and parallel connection exist among the plurality of battery cells 20. The plurality of battery cells 20 may be directly connected in series, parallel, or series-parallel together, and then an entire module formed by the plurality of battery cells 20 may be accommodated in the box 10. Certainly, in some examples, the battery 100 may be in the form of a battery module formed by the plurality of battery cells 20 that are first connected in series, parallel, or series-parallel. The plurality of battery modules are then connected in series, parallel, or series-parallel to form a whole and accommodated in the box 10.

In some examples, the battery 100 may include other structures. For example, the battery 100 may include a bus component. The bus component is disposed in the box 10, and the bus component is connected to the plurality of battery cells 20, to achieve electrical connection between the plurality of battery cells 20.

Each battery cell 20 may be a secondary battery or a primary battery, and may alternatively be a lithium-sulfur battery, a sodium-ion battery, or a magnesium-ion battery, but is not limited thereto. The battery cell 20 may be cylindrical, flat, prismatic, or in another shape. For example, in FIG. 3, the battery cell 20 has a cylindrical structure.

Figure 4:
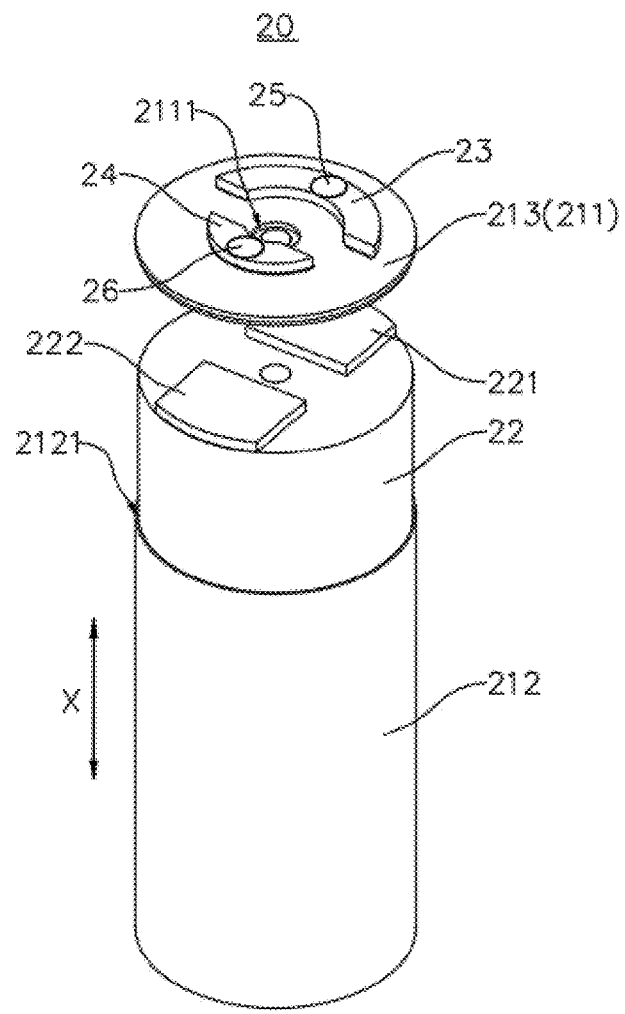
FIG. 4 is an exploded view of a structure of a battery cell according to some examples of the present application.
Figure 5:
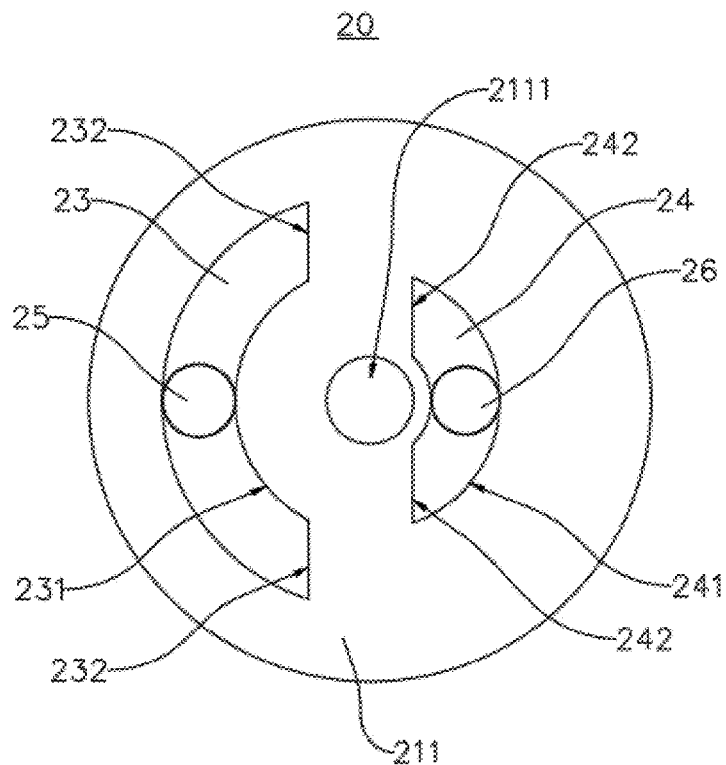
FIG. 5 is a top view of a battery cell according to some examples of the present application.
Figure 6:
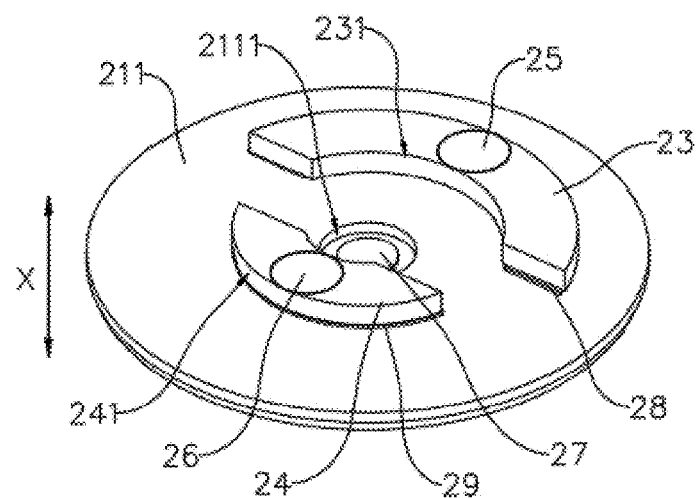
FIG. 6 is a schematic diagram of a partial structure of a battery cell according to some examples of the present application.

According to some examples of the present application, refer to FIG. 3, and further refer to FIG. 4, FIG. 5, and FIG. 6. FIG. 4 is an exploded view of a structure of a battery cell 20 according to some examples of the present application. FIG. 5 is a top view of a battery cell 20 according to some examples of the present application. FIG. 6 is a schematic diagram of a partial structure of a battery cell 20 according to some examples of the present application. The present application provides a battery cell 20. The battery cell 20 includes a shell 21, an electrode assembly 22, a first terminal post 23, and a second terminal post 24. The shell 21 has a circular wall portion 211. The electrode assembly 22 is accommodated in the shell 21. The first terminal post 23 and the second terminal post 24 have opposite polarities. The first terminal post 23 and the second terminal post 24 are spaced apart on the wall portion 211 and are both electrically connected to the electrode assembly 22. A minimum distance between the first terminal post 23 and a central axis of the wall portion 211 is greater than a minimum distance between the second terminal post 24 and the central axis of the wall portion 211 in a radial direction of the wall portion 211.

The shell 21 has a circular wall portion 211. To be specific, one wall of the shell 21 has a circular structure. The wall is the wall portion 211 for disposing the first terminal post 23 and the second terminal post 24. To be specific, the wall portion 211 has a disk-shaped structure. The central axis of the wall portion 211 is a center of a circle that extends in a thickness direction X of the wall portion and is defined by a projection of the wall portion 211 in the thickness direction X of the wall portion. It should be noted that the radial direction of the wall portion 211 refers to a direction pointing from an outer edge of the wall portion 211 to the central axis of the wall portion 211 or a direction pointing from the central axis of the wall portion 211 to the outer edge of the wall portion 211 in a plane perpendicular to the thickness direction X of the wall portion.

The shell 21 may be further configured to accommodate an electrolyte, for example, an electrolyte solution. The shell 21 may be in various structural forms. Similarly, the shell 21 may alternatively be made of various materials, such as copper, iron, aluminum, steel, or an aluminum alloy.

In some examples, the shell 21 may include a case 212 and an end cover 213. An accommodating cavity is formed inside the case 212. The accommodating cavity is used for accommodating the electrode assembly 22, and the accommodating cavity has an opening 2121. To be specific, the case 212 has a hollow structure having an opening 2121 at one end. The end cover 213 covers the opening 2121 of the case 212 and forms a sealing connection, to form a sealed space for accommodating the electrode assembly 22 and the electrolyte.

It should be noted that the wall portion 211 for disposing the first terminal post 23 and the second terminal post 24 may be the end cover 213 of the shell 21, or may be a wall of the case 212 of the shell 21. For example, in FIG. 3 and FIG. 4, the wall portion 211 is the end cover 213. Certainly, a structure of the battery cell 20 is not limited to this. In another example, the wall portion 211 may alternatively be a bottom wall opposite to the case 212 and the end cover 213.

When the battery cell 20 is assembled, the electrode assembly 22 may be first placed in the case 212, and the case 212 is filled with an electrolyte solution. Then, the first terminal post 23 and the second terminal post 24 on the end cover 213 are electrically connected to the electrode assembly 22. Then, the end cover 213 covers the opening 2121 of the case 212, to complete the assembly of the battery cell 20.

The case 212 may be in various shapes, such as a cylinder or a cone. The shape of the case 212 may be determined based on a specific shape of the electrode assembly 22. Certainly, the end cover 213 may have a variety of structures. For example, the end cover 213 has a plate-like structure, a hollow structure having an open end, or the like. For example, in FIG. 4, the case 212 has a cylindrical structure, and the end cover 213 has a circular plate-like structure, to form the shell 21 having the cylindrical structure.

Certainly, it may be understood that the shell 21 is not limited to the foregoing structure, and the shell 21 may alternatively have another structure. For example, the shell 21 may include a case 212 and two end covers 213. The case 212 has a hollow structure having two opposite side openings 2121. One end cover 213 correspondingly covers one opening 2121 of the case 212 and forms a sealing connection, to form a sealed space for accommodating the electrode assembly 22 and the electrolyte. To be specific, the case 212 is formed with openings 2121 on two opposite sides, and the two end covers 213 separately cover two sides of the case 212, to close the corresponding openings 2121.

It should be noted that the electrode assembly 22 is a component that undergoes an electro-chemical reaction in the battery cell 20. The electrode assembly 22 may have a variety of structures. For example, the electrode assembly 22 may have a winding structure formed by winding a positive electrode plate, a spacer, and a negative electrode plate, or may have a stacked structure formed by stacking a positive electrode plate, a spacer, and a negative electrode plate. For example, in FIG. 4, the electrode assembly 22 has a winding structure formed by winding a positive electrode plate, a spacer, and a negative electrode plate, and the electrode assembly 22 has a cylindrical structure.

For example, the spacer is a separator. A main material of the separator may be selected from at least one of glass fiber, non-woven fabric, polyethylene, polypropylene, and polyvinylidene fluoride.

Optionally, there may be one or more electrode assemblies 22 accommodated in the shell 21. For example, in FIG. 4, the shell 21 of the battery cell 20 is provided with an electrode assembly 22. Certainly, in another example, there may be two, three, four, five, six, seven, or eight electrode assemblies 22 accommodated in the shell 21.

The first terminal post 23 and the second terminal post 24 play a role of outputting or inputting a positive electrode and a negative electrode of the battery cell 20. The electrode assembly 22 has two tabs. The two tabs are respectively a first tab 221 and a second tab 222. The first tab 221 and the second tab 222 have opposite polarities. The first terminal post 23 and the second terminal post 24 are respectively electrically connected to the first tab 221 and the second tab 222 of the electrode assembly 22, so as to implement input or output of the positive electrode and the negative electrode of the battery cell 20. It should be noted that the tab of the electrode assembly 22 is a component formed by stacking and connecting regions on the positive electrode plate that are not applied with a positive active material layer or a component formed by stacking and connecting regions on the negative electrode plate that are not applied with a negative active material layer. If the tab is configured to output a positive electrode of the electrode assembly 22, the tab is the component formed by stacking and connecting the regions on the positive electrode plate that are not applied with the positive active material layer. If the tab is configured to output a negative electrode of the electrode assembly 22, the tab is the component formed by stacking and connecting the regions on the negative electrode plate that are not applied with the negative active material layer.

For example, the first terminal post 23 and the second terminal post 24 may alternatively be made of various materials, such as copper, iron, aluminum, steel, or an aluminum alloy.

It should be noted that the first terminal post 23 may be configured to output or input the positive electrode of the battery cell 20, and correspondingly, the second terminal post 24 may be configured to output or input the negative electrode of the battery cell 20. Certainly, the first terminal post 23 may be configured to output or input the negative electrode of the battery cell 20, and correspondingly, the second terminal post 24 may be configured to output or input the positive electrode of the battery cell 20.

The first terminal post 23 and the second terminal post 24 are both disposed on the wall portion 211 of the shell 21. To be specific, the first terminal post 23 and the second terminal post 24 are mounted on a same wall of the shell 21. To be specific, the battery cell 20 has a structure in which the first terminal post 23 and the second terminal post 24 are drawn out at a same end.

For example, in FIG. 4, the first terminal post 23 and the second terminal post 24 are both disposed on a side of the wall portion 211 facing away from the electrode assembly 22. The battery cell 20 may further include a first connecting element 25 and a second connecting element 26. The first connecting element 25 and the second connecting element 26 extend through two sides of the wall portion 211 in the thickness direction X of the wall portion. The first connecting element 25 connects the first terminal post 23 and the electrode assembly 22. The second connecting element 26 connects the second terminal post 24 and the electrode assembly 22. Certainly, in another example, the battery cell 20 may not be provided with the first connecting element 25 and the second connecting element 26. The first terminal post 23 and the second terminal post 24 may be structures that extend through the wall portion 211 in the thickness direction X of the wall portion.

The minimum distance between the first terminal post 23 and the central axis of the wall portion 211 is greater than the minimum distance between the second terminal post 24 and the central axis of the wall portion 211 in the radial direction of the wall portion 211. To be specific, spacing between the first terminal post 23 and the central axis of the wall portion 211 is greater than spacing between the second terminal post 24 and the central axis of the wall portion 211 in a diameter direction of the wall portion 211, so that at least a portion of the first terminal post 23 and at least a portion of the second terminal post 24 center on the central axis of the wall portion 211 and are located on circumferences of different radii in structure.

Optionally, the first terminal post 23 may have a variety of structures, for example, an arc-shaped structure or an annular structure. When the first terminal post 23 has an arc-shaped structure or an annular structure, a structure in which the first terminal post 23 surrounds the exterior of the second terminal post 24 in an arc extension direction is implemented. Similarly, the second terminal post 24 may have a variety of structures, for example, an arc-shaped structure, an annular structure, a circular structure, a sector structure, a triangular structure, or a rectangular structure.

For example, in FIG. 6, the wall portion 211 is further provided with a liquid injection hole 2111, and an electrolyte solution can be injected into the shell 21 of the battery cell 20 through the liquid injection hole 2111. The liquid injection hole 2111 extends through two sides of the wall portion 211 in the thickness direction X of the wall portion, and a central axis of the liquid injection hole 2111 is collinear with axes of an inner arc surface 231 and an outer arc surface 241. The second terminal post 24 has an arc-shaped structure disposed around the liquid injection hole 2111. A liquid injection plug 27 is further disposed in the liquid injection hole 2111. The liquid injection plug 27 is configured to block the liquid injection hole 2111, so as to relieve a risk of leakage of the electrolyte solution inside the shell 21 from the liquid injection hole 2111.

In some examples, the battery cell 20 may further include a pressure relief mechanism. The pressure relief mechanism is mounted on the shell 21. Optionally, the pressure relief mechanism may be disposed on the end cover 213 of the shell 21, or may be disposed on the case 212 of the shell 21. The pressure relief mechanism is configured to relieve pressure inside the battery cell 20 when an internal pressure or temperature of the battery cell 20 reaches a predetermined value.

For example, the pressure relief mechanism may be a pressure relief component such as an explosion-proof valve, a rupture disk, a gas valve, a pressure relief valve, or a safety valve.

The first terminal post 23 and the second terminal post 24 are both disposed on the wall portion 211 of the shell 21, so that the battery cell 20 has a structure in which terminal posts are drawn out on a same side. The wall portion 211 has a circular structure, and the minimum distance between the first terminal post 23 and the central axis of the wall portion 211 is greater than the minimum distance between the second terminal post 24 and the central axis of the wall portion 211 in the radial direction of the wall portion 211, so that at least a portion of the first terminal post 23 and at least a portion of the second terminal post 24 center on the central axis of the wall portion 211 and are located on circumferences of different radii in structure, thereby facilitating distinguishing and avoiding errors in a formation process of the battery cell 20. The battery cell 20 does not need to be secondarily positioned to adjust positions corresponding to the first terminal post 23 and the second terminal post 24 but a positive probe and a negative probe of a formation device are configured into an annular structure in which an outer ring surrounds an inner ring and can be in separate contact with the first terminal post 23 and the second terminal post 24, thereby facilitating optimization of a cycle time of the battery cell 20 to improve production efficiency of the battery cell 20 and reduce production costs.

According to some examples of the present application, referring to FIG. 5 and FIG. 6, the first terminal post 23 is arc-shaped and includes an inner arc surface 231. A projection of the inner arc surface 231 in a thickness direction X of the wall portion is located on a circumference of a first circle. A center of the first circle is located on the central axis of the wall portion 211. The second terminal post 24 is located within the first circle in the radial direction of the wall portion 211.

The first terminal post 23 is arc-shaped. To be specific, the first terminal post 23 has a structure extending along an arc. The first terminal post 23 may have an annular structure, or may be an arc segment of an annular structure. The first terminal post 23 includes an inner arc surface 231. The inner arc surface 231 is an arc surface of an inner peripheral side of the first terminal post 23 having the arc-shaped structure. To be specific, the inner arc surface 231 is a side face, in an outer surface of the first terminal post 23, for connecting two opposite surfaces of the first terminal post 23 in the thickness direction X of the wall portion, and the side face is arc-shaped and is located on the inner peripheral side of the first terminal post 23.

A projection of the inner arc surface 231 in the thickness direction X of the wall portion is located on a circumference of a first circle. To be specific, the inner arc surface 231 of the first terminal post 23 is a structure extending along the circumference of the first circle, and a center of the first circle is located on the central axis of the wall portion 211.

The second terminal post 24 is located within the first circle in the radial direction of the wall portion 211. To be specific, a structure in which the first terminal post 23 surrounds the exterior of the second terminal post 24 in an arc extension direction is implemented.

The first terminal post 23 is arc-shaped and has the inner arc surface, and the second terminal post 24 is located within the first circle in which the inner arc surface 231 of the first terminal post 23 is located, so as to implement a structure in which the first terminal post 23 surrounds the exterior of the second terminal post 24 in an arc extension direction, thereby implementing a structure in which the first terminal post 23 and the second terminal post 24 are located on different circumferences by centering on the central axis of the wall portion 211, so as to facilitate distinguishing and avoid errors for the first terminal post 23 and the second terminal post 24 in the formation process of the battery cell 20, and avoid secondary positioning of the first terminal post 23 and the second terminal post 24.

In some examples, referring to FIG. 5, the first terminal post 23 is an arc segment of an annular structure. Two ends of the first terminal post 23 separately form two first end faces 232 in an arc extension direction of the first terminal post 23. The two first end faces 232 are coplanar. To be specific, the two first end faces 232 of the two ends of the first terminal post 23 in a circumferential direction thereof are located in a same plane.

The two first end faces 232 of the first terminal post 23 having the arc-shaped structure in the arc extension direction are coplanar, so as to facilitate processing and forming of the first terminal post 23. The first terminal post 23 may be formed by cutting or stamping only once, so as to be beneficial to improving the production efficiency of the first terminal post 23.

According to some examples of the present application, referring to FIG. 5 and FIG. 6, the second terminal post 24 includes an outer arc surface 241. A projection of the outer arc surface 241 in the thickness direction X of the wall portion is located on a circumference of a second circle. The second circle and the first circle are concentric, and a radius of the second circle is less than a radius of the first circle.

The second terminal post 24 includes an outer arc surface 241. To be specific, a surface of an outer peripheral side of the second terminal post 24 is an arc-shaped surface. To be further specific, the outer arc surface 241 is a side face, in an outer surface of the second terminal post 24, for connecting two opposite surfaces of the second terminal post 24 in the thickness direction X of the wall portion, and the side face is arc-shaped and is located on the outer peripheral side of the second terminal post 24.

For example, the second terminal post 24 may have a variety of structures. For example, the second terminal post 24 may have an arc-shaped structure, an annular structure, a circular structure, a sector structure, or the like.

A projection of the outer arc surface 241 in the thickness direction X of the wall portion is located on a circumference of a second circle. To be specific, the outer arc surface 241 of the second terminal post 24 is a structure extending along the circumference of the second circle, and a center of the second circle is located on the central axis of the wall portion 211.

The second circle and the first circle are concentric. To be specific, the inner arc surface 231 and the outer arc surface 241 are coaxially disposed. To be further specific, a circle in which the projection of the inner arc surface 231 of the first terminal post 23 on the wall portion 211 is located is concentric to a circle in which the projection of the outer arc surface 241 of the second terminal post 24 on the wall portion 211 is located, in the thickness direction X of the wall portion.

The radius of the second circle is less than the radius of the first circle. To be specific, the radius of the inner arc surface 231 is greater than the radius of the outer arc surface 241. To be further specific, a radius of a circle in which the projection of the inner arc surface 231 of the first terminal post 23 on the wall portion 211 is located is greater than a radius of a circle in which the projection of the outer arc surface 241 of the second terminal post 24 on the wall portion 211 is located, in the thickness direction X of the wall portion.

The second terminal post 24 has the outer arc surface 241, and the radius of the second circle in which the outer arc surface 241 of the second terminal post 24 is located is less than the radius of the first circle in which the inner arc surface 231 of the first terminal post 23 is located, so that the radius of the inner arc surface 231 of the first terminal post 23 is greater than the radius of the outer arc surface 241 of the second terminal post 24, thereby facilitating implementation of a structure in which the first terminal post 23 and the second terminal post 24 are located on different circumferences by centering on the central axis of the wall portion 211.

In some examples, referring to FIG. 5 and FIG. 6 again, the second terminal post 24 is arc-shaped.

The second terminal post 24 is arc-shaped. The second terminal post 24 may have an annular structure, or may be an arc segment of an annular structure. For example, the second terminal post 24 is an arc segment of an annular structure.

The second terminal post 24 has an arc-shaped structure, so as to facilitate assembly of the first terminal post 23 and the second terminal post 24, and reduce material waste of the second terminal post 24, thereby improving the production efficiency of the battery cell 20 and reducing manufacturing costs.

In some examples, referring to FIG. 5, two ends of the second terminal post 24 separately form two second end faces 242 in the arc extension direction of the second terminal post 24. The two second end faces 242 are coplanar. To be specific, the two second end faces 242 of the two ends of the second terminal post 24 in a circumferential direction thereof are located in a same plane.

The two second end faces 242 of the second terminal post 24 having the arc-shaped structure in the arc extension direction are coplanar, so as to facilitate processing and forming of the second terminal post 24. The second terminal post 24 may be formed by cutting or stamping only once, so as to be beneficial to improving the production efficiency of the second terminal post 24.

According to some examples of the present application, referring to FIG. 5, an orthographic projection of the first terminal post 23 is located in a first semicircular region and an orthographic projection of the second terminal post 24 is located in a second semicircular region in the thickness direction X of the wall portion. The first semicircular region and the second semicircular region jointly form a circular region of which a center is located on the central axis of the wall portion 211.

The first semicircular region and the second semicircular region jointly form the circular region of which the center is located on the central axis of the wall portion 211. To be specific, the first terminal post 23 and the second terminal post 24 are located within different semicircles of a same circular region, and a center of the circular region is located on the central axis of the wall portion 211, so that the first terminal post 23 and the second terminal post 24 are spaced apart structurally.

For example, in FIG. 5, the first terminal post 23 and the second terminal post 24 are disposed oppositely and are bent in a direction away from each other. Certainly, in some examples, the first terminal post 23 and the second terminal post 24 may also be bent in a same direction.

The projections of the first terminal post 23 and the second terminal post 24 in the thickness direction X of the wall portion are respectively located in the first semicircular region and the second semicircular region, and the first semicircular region and the second semicircular region jointly form the circular region of which the center is located on the central axis of the wall portion 211, so that the first terminal post 23 and the second terminal post 24 are spaced apart on the wall portion 211. On the one hand, the first terminal post 23 and the second terminal post 24 can be assembled, thereby facilitating assembly difficulty of the battery cell 20. On the other hand, spacing between the first terminal post 23 and the second terminal post 24 can be further increased, to reduce a risk of short circuit between the first terminal post 23 and the second terminal post 24.

It should be noted that the structure of the battery cell 20 is not limited to this. In some examples, the first terminal post 23 and the second terminal post 24 may have other structures. For example, the first terminal post 23 is annular, and the first terminal post 23 and the wall portion 211 are disposed coaxially. To be specific, the first terminal post 23 has an annular structure surrounding by centering on the central axis of the wall portion 211. Additionally or alternatively, the second terminal post 24 is annular, and the second terminal post 24 and the wall portion 211 are disposed coaxially. To be specific, the second terminal post 24 also has an annular structure surrounding by centering on the central axis of the wall portion 211.

When the first terminal post 23 has an annular structure, the first terminal post 23 surrounds the exterior of the second terminal post 24, and the second terminal post 24 may have an annular structure, an arc-shaped structure, a circular structure, a sector structure, or the like. When the second terminal post 24 has an annular structure, the first terminal post 23 surrounds the exterior of the second terminal post 24 in a circumferential direction thereof, and the second terminal post 24 may have an annular structure or an arc-shaped structure.

The first terminal post 23 has an annular structure, thereby forming an annular structure in which the first terminal post 23 surrounds the exterior of the second terminal post 24. Therefore, a contact area between the first terminal post 23 and a probe of the formation device can be increased in the formation process of the battery cell 20. Therefore, the probe can be in contact with the first terminal post 23 without providing an annular probe of the formation device. Similarly, the second terminal post 24 has an annular structure, thereby forming an annular structure in which the second terminal post 24 is located inside the inner arc surface 231 of the first terminal post 23. Therefore, a contact area between the second terminal post 24 and a probe of the formation device can be increased in the formation process of the battery cell 20. Therefore, the probe can be in contact with the second terminal post 24 without providing an annular probe of the formation device.

According to some examples of the present application, referring to FIG. 4, the electrode assembly 22 has a first tab 221 and a second tab 222 having opposite polarities. The first tab 221 and the second tab 222 are both located at an end, facing the wall portion 211, of the electrode assembly 22 in the thickness direction X of the wall portion. The first tab 221 and the second tab 222 are respectively electrically connected to the first terminal post 23 and the second terminal post 24.

The first tab 221 and the second tab 222 are spaced apart at the end, facing the wall portion 211, of the electrode assembly 22. It should be noted that the first tab 221 may be directly connected, for example, welded or abutted, to the first terminal post 23. Certainly, the first tab 221 may be indirectly connected to the first terminal post 23. For example, the first terminal post 23 is connected to another component and then is welded or abutted to the first tab 221. Similarly, the second tab 222 may be directly connected, for example, welded or abutted, to the second terminal post 24. Certainly, the second tab 222 may be indirectly connected to the second terminal post 24. For example, the second terminal post 24 is connected to another component and then is welded or abutted to the second tab 222.

The electrode assembly 22 has the first tab 221 and the second tab 222 having opposite polarities, and the first tab 221 and the second tab 222 are respectively electrically connected to the first terminal post 23 and the second terminal post 24, to implement input or output of electric energy of the electrode assembly 22. The first tab 221 and the second tab 222 are both disposed at the end, facing the wall portion 211, of the electrode assembly 22, so that the first tab 221 and the second tab 222 are respectively connected to the first terminal post 23 and the second terminal post 24, thereby being beneficial to reducing assembly difficulty of the electrode assembly 22 with the first terminal post 23 and the second terminal post 24, to improve the production efficiency of the battery cell 20.

Figure 7:
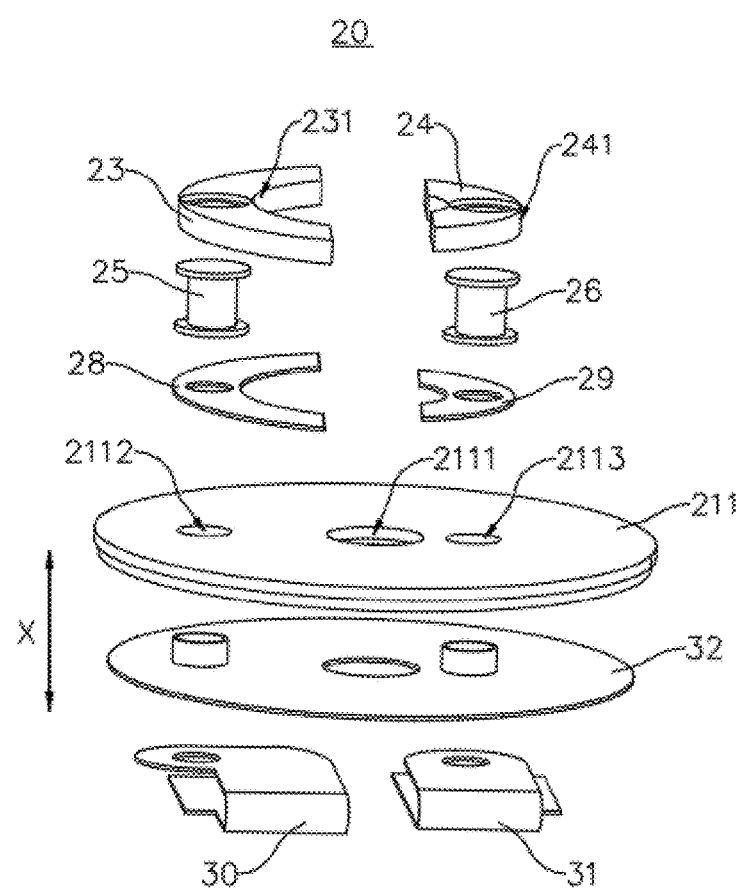
FIG. 7 is an exploded view of a partial structure of a battery cell according to some examples of the present application.

According to some examples of the present application, refer to FIG. 4 and FIG. 6, and further refer to FIG. 7. FIG. 7 is an exploded view of a partial structure of a battery cell 20 according to some examples of the present application. The battery cell 20 may further include a first insulating element 28. The first insulating element 28 is disposed between the first terminal post 23 and the wall portion 211, to insulate the first terminal post 23 from the wall portion 211. Additionally or alternatively, the battery cell 20 may further include a second insulating element 29. The second insulating element 29 is disposed between the second terminal post 24 and the wall portion 211, to insulate the second terminal post 24 from the wall portion 211.

The first terminal post 23 is disposed on a side of the wall portion 211 facing away from the electrode assembly 22. The first insulating element 28 is disposed between the first terminal post 23 and the wall portion 211 in the thickness direction X of the wall portion, to insulate the first terminal post 23 from the wall portion 211.

For example, the first insulating element 28 may be made of various materials, such as rubber, plastic, or silica gel.

The second terminal post 24 is disposed on a side of the wall portion 211 facing away from the electrode assembly 22. The second insulating element 29 is disposed between the second terminal post 24 and the wall portion 211 in the thickness direction X of the wall portion, to insulate the second terminal post 24 from the wall portion 211.

For example, the second insulating element 29 may be made of various materials, such as rubber, plastic, or silica gel.

The battery cell 20 is further provided with the first insulating element 28. The first insulating element 28 is disposed between the first terminal post 23 and the wall portion 211, to insulate the first terminal post 23 from the wall portion 211, so that a risk of short circuit between the first terminal post 23 and the wall portion 211 can be reduced, to relieve a phenomenon of short circuit between the first terminal post 23 and the second terminal post 24. Similarly, the battery cell 20 is further provided with the second insulating element 29. The second insulating element 29 is disposed between the second terminal post 24 and the wall portion 211, to insulate the second terminal post 24 from the wall portion 211, so that a risk of short circuit between the second terminal post 24 and the wall portion 211 can be reduced, to relieve a phenomenon of short circuit between the second terminal post 24 and the first terminal post 23.

According to some examples of the present application, referring to FIG. 4 and FIG. 7, the battery cell 20 may further include a first connecting element 25. The first connecting element 25 is penetrated in the wall portion 211 in the thickness direction X of the wall portion. The first connecting element 25 is connected to the first terminal post 23, and the first connecting element 25 is electrically connected to the electrode assembly 22. Additionally or alternatively, the battery cell 20 may further include a second connecting element 26. The second connecting element 26 is penetrated in the wall portion 211 in the thickness direction X of the wall portion. The second connecting element 26 is connected to the second terminal post 24, and the second connecting element 26 is electrically connected to the electrode assembly 22.

The wall portion 211 is provided with a first through hole 2112. The first through hole 2112 extends through two sides of the wall portion 211 in the thickness direction X of the wall portion. A portion of the first connecting element 25 is located in the first through hole 2112, so that the first connecting element 25 can connect the first terminal post 23 and the first tab 221 of the electrode assembly 22.

Optionally, there may be a plurality of connection structures between the first connecting element 25 and the first terminal post 23. For example, the first connecting element 25 is riveted to the first terminal post 23. Certainly, in another example, the first connecting element 25 may alternatively be welded, clamped, or the like to the first terminal post 23. Similarly, the first connecting element 25 may alternatively be made of various materials, such as copper, iron, aluminum, steel, or an aluminum alloy.

The wall portion 211 is further provided with a second through hole 2113. The second through hole 2113 extends through the two sides of the wall portion 211 in the thickness direction X of the wall portion. A portion of the second connecting element 26 is located in the second through hole 2113, so that the second connecting element 26 can connect the second terminal post 24 and the second tab 222 of the electrode assembly 22.

Optionally, there may be a plurality of connection structures between the second connecting element 26 and the second terminal post 24. For example, the second connecting element 26 is riveted to the second terminal post 24. Certainly, in another example, the second connecting element 26 may alternatively be welded, clamped, or the like to the second terminal post 24. Similarly, the second connecting element 26 may alternatively be made of various materials, such as copper, iron, aluminum, steel, or an aluminum alloy.

In some examples, referring to FIG. 4 and FIG. 7, the battery cell 20 may further include a first current collecting member 30 and a second current collecting member 31. The first current collecting member 30 and the second current collecting member 31 are both located in the shell 21. The first current collecting member 30 is connected to the first connecting element 25 and the first tab 221 of the electrode assembly 22, to electrically connect the electrode assembly 22 and the first terminal post 23. The second current collecting member 31 is connected to the second connecting element 26 and the second tab 222 of the electrode assembly 22, to electrically connect the electrode assembly 22 and the second terminal post 24.

A connection structure between the first current collecting member 30 and the first connecting element 25 may be welding, riveting, or the like. Similarly, a connection structure between the second current collecting member 31 and the second connecting element 26 may be welding, riveting, or the like.

The first current collecting member 30 and the first tab 221 may be welded, abutted, or the like. Similarly, the second current collecting member 31 and the second tab 222 may be welded, abutted, or the like.

For example, the first current collecting member 30 and the second current collecting member 31 may alternatively be made of various materials, such as copper, iron, aluminum, steel, or an aluminum alloy.

Optionally, the battery cell 20 may further include a third insulating element 32. The third insulating element 32 is disposed on a side, facing the electrode assembly 22, of the wall portion 211. In the thickness direction X of the wall portion, a portion of the third insulating element 32 is located between the wall portion 211 and the first current collecting member 30, to insulate the wall portion 211 from the first current collecting member 30, and a portion of the third insulating element 32 is located between the wall portion 211 and the second current collecting member 31, to insulate the wall portion 211 from the second current collecting member 31.

For example, the third insulating element 32 may be made of rubber, plastic, or silica gel.

The battery cell 20 is further provided with the first connecting element 25. The first connecting element 25 is penetrated in the wall portion 211 in the thickness direction X of the wall portion, so that the first connecting element 25 can connect the first terminal post 23 and the electrode assembly 22, thereby being beneficial to reducing assembly difficulty of electrical connection between the first terminal post 23 and the electrode assembly 22, and reducing assembly difficulty of the first terminal post 23 on the wall portion 211. Similarly, the battery cell 20 is further provided with the second connecting element 26. The second connecting element 26 is penetrated in the wall portion 211 in the thickness direction X of the wall portion, so that the second connecting element 26 can connect the second terminal post 24 and the electrode assembly 22, thereby being beneficial to reducing assembly difficulty of electrical connection between the second terminal post 24 and the electrode assembly 22, and reducing assembly difficulty of the second terminal post 24 on the wall portion 211.

According to some examples of the present application, referring to FIG. 3 and FIG. 4, the shell 21 is cylindrical, and an axis direction of the shell 21 is the thickness direction X of the wall portion.

An axis direction of the shell 21 is the thickness direction X of the wall portion. To be specific, the wall portion 211 is one of two circular end walls of the shell 21 in the axis direction of the wall portion. To be further specific, the wall portion 211 may be the end cover 213 of the shell 21, or may be a bottom wall of the case 212 of the shell 21 opposite to the end cover 213.

The shell 21 of the battery cell 20 is cylindrical, so that the battery cell 20 has a cylindrical structure, and the axis direction of the shell 21 is the thickness direction X of the wall portion. To be specific, the wall portion 211 is an end wall of the shell 21 in the axis direction, so that the wall portion 211 is circular. The battery cell 20 using this structure facilitates assembly of the first terminal post 23 and the second terminal post 24 on the shell 21, so as to be beneficial to reducing assembly difficulty of the battery cell 20. In addition, secondary positioning is not required to adjust the corresponding positions of the first terminal post 23 and the second terminal post 24 in the formation process of the battery cell 20 having the cylindrical structure, so as to be beneficial to optimizing the cycle time of the battery cell 20, to improve the production efficiency of the battery cell 20.

According to some examples of the present application, referring to FIG. 3 and FIG. 4, the shell 21 may include a case 212 and an end cover 213. An accommodating cavity having an opening 2121 is formed inside the case 212. The accommodating cavity is configured to accommodate the electrode assembly 22. The end cover 213 closes the opening 2121. The end cover 213 is the wall portion 211.

The end cover 213 is the wall portion 211. To be specific, the first terminal post 23 and the second terminal post 24 are both disposed on the end cover 213.

The wall portion 211 of the shell 21 is configured into the end cover 213 of the shell 21 for closing the opening 2121 of the case 212. The battery cell 20 using this structure facilitates assembly of the first terminal post 23 and the second terminal post 24, and connection difficulty of the first terminal post 23 and the second terminal post 24 to the electrode assembly 22 can be reduced, thereby improving the production efficiency of the battery cell 20.

It should be noted that the structure of the battery cell 20 is not limited to this. In some examples, the battery cell 20 may alternatively have another structure. For example, the shell 21 may include a case 212 and an end cover 213. The case 212 includes a side wall and the wall portion 211 that are integrally formed. The side wall is disposed around the wall portion 211. One end of the side wall is connected to the wall portion 211 and the other end of the side wall is closed to form an opening 2121 in the thickness direction X of the wall portion. The side wall and the wall portion 211 jointly define an accommodating cavity for accommodating the electrode assembly 22. The end cover 213 closes the opening 2121. To be specific, the wall portion 211 is a bottom wall of the case 212 opposite to the end cover 213 in the thickness direction X of the wall portion. To be further specific, the first terminal post 23 and the second terminal post 24 are both disposed on the bottom wall of the case 212.

The case 212 includes the side wall and the wall portion 211 that are integrally formed. To be specific, the case 212 is manufactured by using an integral forming process, for example, stamping, casting, or extrusion molding. To be further specific, the side wall and the wall portion 211 of the case 212 have an integral structure.

The wall portion 211 is configured into a wall, opposite to the end cover 213, of the case 212. In the battery cell 20 having this structure, the wall portion 211 on which the first terminal post 23 and the second terminal post 24 are disposed can be far away from the end cover 213, and there is no direct connection relationship between the wall portion 211 and the end cover 213. Therefore, in a use process of the battery cell 20, a phenomenon that a force generated when the first terminal post 23 and the second terminal post 24 pull or twist the end cover 213 acts on a connection position of the end cover 213 and the case 212 can be relieved, to reduce a risk of connection failure between the end cover 213 and the case 212, thereby further reducing a risk of liquid leakage in the use process of the battery cell 20.

According to some examples of the present application, the present application further provides a battery 100. The battery 100 includes a battery cell 20 according to any one of the foregoing solutions.

According to some examples of the present application, the present application further provides a power consuming apparatus. The power consuming apparatus includes a battery cell 20 according to any one of the foregoing solutions, and the battery cell 20 is configured to supply electric energy to the power consuming apparatus.

The power consuming apparatus may be any one of the foregoing devices or systems to which the battery 100 is applied.

According to some examples of the present application, referring to FIG. 3 to FIG. 7, the present application provides a battery cell 20. The battery cell 20 includes a shell 21, an electrode assembly 22, a first terminal post 23, a second terminal post 24, a first connecting element 25, a second connecting element 26, a first insulating element 28, a second insulating element 29, a first current collecting member 30, a second current collecting member 31, and a third insulating element 32. The shell 21 is cylindrical. The shell 21 includes a case 212 and an end cover 213. An accommodating cavity having an opening 2121 is formed inside the case 212. The accommodating cavity is configured to accommodate the electrode assembly 22. The end cover 213 is connected to an end of the case 212 on a central axis of the shell 21. The end cover 213 closes the opening 2121. The end cover 213 is a wall portion 211. The electrode assembly 22 is accommodated in the accommodating cavity of the case 212. The electrode assembly 22 has a first tab 221 and a second tab 222 having opposite polarities. The first tab 221 and the second tab 222 are both located at an end, facing the wall portion 211, of the electrode assembly 22 in a thickness direction X of the wall portion. The first terminal post 23 and the second terminal post 24 have opposite polarities, and the first terminal post 23 and the second terminal post 24 are both disposed on a side of the wall portion 211 facing away from the electrode assembly 22. The first terminal post 23 and the second terminal post 24 both have arc-shaped structures. The first terminal post 23 includes an inner arc surface 231, and the second terminal post 24 includes an outer arc surface 241. The inner arc surface 231 of the first terminal post 23, the outer arc surface 241 of the second terminal post 24, and an axis of the shell 21 are all coaxially disposed. A radius of the inner arc surface 231 is greater than a radius of the outer arc surface 241. The first connecting element 25 and the second connecting element 26 are both penetrated in the wall portion 211 in the thickness direction X of the wall portion. The first connecting element 25 is connected to the first terminal post 23, and the second connecting element 26 is connected to the second terminal post 24. In the thickness direction X of the wall portion, the first insulating element 28 is disposed between the first terminal post 23 and the wall portion 211, and the second insulating element 29 is disposed between the second terminal post 24 and the wall portion 211. The first current collecting member 30 and the second current collecting member 31 are both located in the shell 21. The first current collecting member 30 is connected to the first connecting element 25 and the first tab 221, to electrically connect the first terminal post 23 and the electrode assembly 22. The second current collecting member 31 is connected to the second connecting element 26 and the second tab 222, to electrically connect the second terminal post 24 and the electrode assembly 22. The third insulating element 32 is disposed on a side, facing the electrode assembly 22, of the wall portion 211. In the thickness direction X of the wall portion, a portion of the third insulating element 32 is located between the first current collecting member 30 and the wall portion 211, and a portion of the third insulating element 32 is located between the second current collecting member 31 and the wall portion 211.

It should be noted that the examples of the present application and features in the examples may be combined with each other without conflicts.

The foregoing descriptions are merely preferred examples of the present application and are not intended to limit the present application. For a person skilled in the art, the present application may have various modifications and changes. Any modification, equivalent replacement, or improvement made without departing from the spirit and principle of the present application shall fall within the protection scope of the present application.

What is claimed is:

1. A battery cell, comprising:
   a shell, having a circular wall portion;
   an electrode assembly, accommodated in the shell; and
   a first terminal post and a second terminal post having opposite polarities, spaced apart on the wall portion and both electrically connected to the electrode assembly, wherein
   a minimum distance between the first terminal post and a central axis of the wall portion is greater than a minimum distance between the second terminal post and the central axis of the wall portion in a radial direction of the wall portion, wherein at least one of the first terminal post and the second terminal post is arc-shaped.

2. The battery cell according to claim 1, wherein the first terminal post is arc-shaped and comprises an inner arc surface, a projection of the inner arc surface in a thickness direction of the wall portion is located on a circumference of a first circle, and a center of the first circle is located on the central axis of the wall portion, wherein
   the second terminal post is located within the first circle in the radial direction of the wall portion.

3. The battery cell according to claim 2, wherein two ends of the first terminal post separately form two first end faces in an arc extension direction of the first terminal post, and the two first end faces are coplanar.

4. The battery cell according to claim 2, wherein the second terminal post comprises an outer arc surface, a projection of the outer arc surface in the thickness direction of the wall portion is located on a circumference of a second circle, the second circle and the first circle are concentric, and a radius of the second circle is less than a radius of the first circle.

5. The battery cell according to claim 4, wherein the second terminal post is arc-shaped.

6. The battery cell according to claim 5, wherein two ends of the second terminal post separately form two second end faces in the arc extension direction of the second terminal post, and the two second end faces are coplanar.

7. The battery cell according to claim 1, wherein an orthographic projection of the first terminal post is located in a first semicircular region and an orthographic projection of the second terminal post is located in a second semicircular region in the thickness direction of the wall portion, and the first semicircular region and the second semicircular region jointly form a circular region of which a center is located on the central axis of the wall portion.

8. The battery cell according to claim 1, wherein the first terminal post is annular, and the first terminal post and the wall portion are disposed coaxially; and/or the second terminal post is annular, and the second terminal post and the wall portion are disposed coaxially.

9. The battery cell according to claim 1, wherein the electrode assembly has a first tab and a second tab having opposite polarities, the first tab and the second tab are both located at an end, facing the wall portion, of the electrode assembly in the thickness direction of the wall portion, and the first tab and the second tab are respectively electrically connected to the first terminal post and the second terminal post.

10. The battery cell according to claim 1, wherein the battery cell further comprises a first insulating element, the first insulating element being disposed between the first terminal post and the wall portion, to insulate the first terminal post from the wall portion; and/or
    the battery cell further comprises a second insulating element, the second insulating element being disposed between the second terminal post and the wall portion, to insulate the second terminal post from the wall portion.

11. The battery cell according to claim 1, wherein the battery cell further comprises a first connecting element, the first connecting element being penetrated in the wall portion in the thickness direction of the wall portion, the first connecting element being connected to the first terminal post, and the first connecting element being electrically connected to the electrode assembly; and/or
    the battery cell further comprises a second connecting element, the second connecting element being penetrated in the wall portion in the thickness direction of the wall portion, the second connecting element being connected to the second terminal post, and the second connecting element being electrically connected to the electrode assembly.

12. The battery cell according to claim 1, wherein the shell is cylindrical, and an axis direction of the shell is the thickness direction of the wall portion.

13. The battery cell according to claim 1, wherein the shell comprises:
    a case, an accommodating cavity having an opening being formed inside the case, and the accommodating cavity being configured to accommodate the electrode assembly; and
    an end cover, closing the opening, wherein the end cover is the wall portion.

14. The battery cell according to claim 1, wherein the shell comprises:
    a case, comprising a side wall and the wall portion that are integrally formed, the side wall being disposed around the wall portion, one end of the side wall being connected to the wall portion and the other end of the side wall being closed to form an opening in the thickness direction of the wall portion, and the side wall and the wall portion jointly defining an accommodating cavity for accommodating the electrode assembly; and
    an end cover, closing the opening.

15. A battery, comprising a battery cell according to claim 1.

16. A power consuming apparatus, comprising a battery cell according to claim 1, the battery cell being configured to supply electric energy.

* * * * *